United States Patent
Rosenthal (10) Patent No.: US 7,177,404 B2
(45) Date of Patent: Feb. 13, 2007

(54) SYSTEM FOR COMPUTER-BASED, CALENDAR-CONTROLLED MESSAGE CREATION AND DELIVERY

(75) Inventor: Lawrence Rosenthal, Berkeley, CA (US)

(73) Assignee: T-Tag Corporation, San Francisco, CA (US)

( * ) Notice: Subject to any disclaimer, the term of this patent is extended or adjusted under 35 U.S.C. 154(b) by 0 days.

(21) Appl. No.: 10/964,175

(22) Filed: Oct. 12, 2004

(65) Prior Publication Data

US 2005/0169443 A1 Aug. 4, 2005

Related U.S. Application Data

(60) Provisional application No. 60/541,563, filed on Feb. 3, 2004.

(51) Int. Cl.
H04M 1/64 (2006.01)

(52) U.S. Cl. ............................... 379/88.17; 379/88.16; 379/88.25

(58) Field of Classification Search ............. 379/88.13, 379/88.14, 88.17, 88.22, 88.25, 93.24
See application file for complete search history.

(56) References Cited

U.S. PATENT DOCUMENTS

| | | | | |
|---|---|---|---|---|
| 4,602,129 A | * | 7/1986 | Matthews et al. | 379/88.26 |
| 4,790,003 A | * | 12/1988 | Kepley et al. | 379/88.18 |
| 5,150,399 A | | 9/1992 | Yasuda | |
| 5,317,628 A | | 5/1994 | Misholi et al. | |
| 5,333,266 A | | 7/1994 | Boaz et al. | |
| 5,652,789 A | * | 7/1997 | Miner et al. | 379/201.01 |
| 5,675,507 A | * | 10/1997 | Bobo, II | 709/206 |
| 5,828,836 A | | 10/1998 | Westwick et al. | |
| 5,960,406 A | * | 9/1999 | Rasansky et al. | 705/9 |
| 6,097,791 A | * | 8/2000 | Ladd et al. | 379/88.19 |
| 6,259,772 B1 | * | 7/2001 | Stephens et al. | 379/88.23 |
| 6,282,269 B1 | * | 8/2001 | Bowater et al. | 379/88.17 |
| 6,289,085 B1 | * | 9/2001 | Miyashita et al. | 379/88.02 |
| 6,430,177 B1 | | 8/2002 | Luzeski et al. | |
| 6,526,274 B1 | | 2/2003 | Fickes et al. | |
| 6,587,895 B1 | | 7/2003 | Golovchinsky et al. | |
| 6,603,838 B1 | | 8/2003 | Brown et al. | |
| 6,680,999 B1 | | 1/2004 | Garcia | |
| 6,760,412 B1 | * | 7/2004 | Loucks | 379/88.13 |
| 6,816,835 B2 | * | 11/2004 | Hayashi | 704/260 |
| 6,857,024 B1 | * | 2/2005 | Chen et al. | 709/231 |
| 6,950,502 B1 | * | 9/2005 | Jenkins | 379/88.12 |
| 2001/0014910 A1 | | 8/2001 | Bobo, II | |
| 2002/0076015 A1 | | 6/2002 | Norwitz et al. | |
| 2002/0091698 A1 | | 7/2002 | Young, III et al. | |
| 2003/0033585 A1 | | 2/2003 | Sheets | |
| 2003/0112266 A1 | | 6/2003 | Chang et al. | |
| 2003/0208688 A1 | | 11/2003 | Bobo, II | |

* cited by examiner

Primary Examiner—Fan Tsang
Assistant Examiner—Simon Sing
(74) Attorney, Agent, or Firm—Beyer Weaver & Thomas, LLP (57) ABSTRACT

Methods and apparatus are described for creating, scheduling and delivering messages. A message having a first audio component is generated in response to input from a user. The input includes words entered by the user. The first audio component is operable to facilitate audible playback of the words. Delivery of the message at a future time to a communication device is scheduled in response to specification of the future time by the user. A connection to the communication device is established at the future time via a communications network. The message is transmitted over the connection such that the words associated with the first audio component of the message are audible via the communication device.

27 Claims, 9 Drawing Sheets

T-Tag

Account Manager (To access this form you must use a web browser on a computer, not a phone)

Please enter your T-Tag username and password below.

Your Username: [        ]
Your Password: [        ]

[Manage My Account]

HOME | NEW ACCOUNT SIGN UP | MANAGE YOUR ACCOUNT

© 2004, T-Tag, All rights reserved

Fig. 3a

T-Tag

Account Management (You must sign up from a web browser on a computer, not from a phone)

| | |
|---|---|
| First Name: | Chris |
| Last Name: | Sampson |
| Username: | csampson |
| Password: | ********* | Enter at least 7 characters only. |
| Verify Password: | ********* |
| Email Address: | csampson@somead |
| Phone Number: | 650 555-1212 | (not your phone address) You will be sent an account verification message to this email address. This number will be used to send test T-Tags to. |
| Default Timezone: | PST-Pacific US, San Francisco, Los Angeles ▽ |
| Default Voice: | Female Voice #1 ▽ |

[Update]

T-Tag

New T-Tag

Delivery Date/Time: November 2, 2004 @ 11:00 AM

☑ Recurring T-Tag: Yes, every [1 ▽] [month(s) ▽]

Default Voice: [Female Voice #1 ▽]

Send Message to: [650 555-1212]     (XXX XXX-XXXX)

or [None ▽]

Sound Effects: [Bulletin ▽]

Standard Message: [None ▽]

Message: [Good morning. Have you made plans for lunch today?]

[PreListen] [Tag Test]

[All Set]

T-Tag will *never* share any of your personal information with anyone. However, the recipients of your T-Tags will hear that they are coming from you.

Fig. 5

T-Tag

New T-Tag

Delivery Date/Time: November 11, 2004 @ 10:30 AM

☐ Recurring T-Tag: Yes, every [ - ] ▷ [ - ] ▷

Default Voice: [ Female Voice #1 ] ▷

Send Message to: [              ] (xxx xxx-xxxx)

or [ None ] ▷

Sound Effects: [ None ] ▷

Standard Message: [ None ] ▷

Message:

602

[ PreListen ] [ Tag Test ]

[ All Set ]

T-Tag will *never* share any of your personal information with anyone. However, the recipients

Fig. 6

| Add New Contact | | A B C D E F G H I J K L M N O P Q R S T U V W X Y Z | | |
|---|---|---|---|---|
| First: | | Name | Phone | Action |
| Last: | | Marsden, Mabel | 408-555-1212 | 🗑 |
| Email: | | Martin, Mickey | 707-555-1212 | 🗑 |
| Phone: | xxx xxx-xxxx | Milton, Mark | 510-555-1212 | 🗑 |
| Save | Reset | | | |

Fig. 7

SYSTEM FOR COMPUTER-BASED, CALENDAR-CONTROLLED MESSAGE CREATION AND DELIVERY

RELATED APPLICATION DATA

The present application claims priority under 35 U.S.C. 119(e) to U.S. Provisional Patent Application No. 60/541,563 for A SYSTEM FOR COMPUTER-BASED, CALENDAR-CONTROLLED TELEPHONE MESSAGE CREATION AND DELIVERY filed on Feb. 3, 2004 the entire disclosure of which is incorporated herein by reference for all purposes.

BACKGROUND OF THE INVENTION

The present invention relates generally to messaging and, in particular, to methods and apparatus for generating and scheduling delivery of messages via a variety of communication media.

People keep track of appointments and other professional or social obligations in a variety of ways. The available solutions include the traditional (e.g., paper calendars, personal assistants), as well as a bewildering array of electronic devices and software (e.g., desktop calendar software, hand-held computing devices, etc.). Some electronic solutions include the capability of generating alerts for impending appointments. However, many such solutions do not communicate with the user in one of the most clear and effective ways, i.e., by telephone.

People also employ a wide variety of messaging solutions to communicate with each other including, for example, email, instant messaging, voice mail, etc. However, these solutions provide only the most rudimentary capabilities for message creation, and typically do not allow the user to schedule delivery of the message to a variety of different device types.

It is therefore desirable to provide messaging solutions by which a user can flexibly create and schedule delivery of messages which are then communicated to the user at the appropriate time via any of a variety of communication channels.

SUMMARY OF THE INVENTION

According to the present invention, methods and apparatus are provided by which individuals may generate and schedule the delivery of messages which include audio components which are played over a communication device at the scheduled time. According to specific embodiments, methods and apparatus for creating, scheduling and delivering messages are provided. A message having a first audio component is generated in response to input from a user. The input includes words entered by the user. The first audio component is operable to facilitate audible playback of the words. Delivery of the message at a future time to a communication device is scheduled in response to specification of the future time by the user. A connection to the communication device is established at the future time via a communications network. The message is transmitted over the connection such that the words associated with the first audio component of the message are audible via the communication device.

According to other specific embodiments, methods and apparatus for creating, and scheduling delivery of messages via a wide area network are provided. Each of a plurality of users at remote devices on the network are enabled to generate a message having a first audio component which incorporates input from the user. The input includes words entered by the user. The first audio component is operable to facilitate audible playback of the words. Each of the users is enabled to schedule delivery of the message at a future time to a communication device in response to specification of the future time and the communication device by the user. Enabling generation and scheduling of each message results in playback of the message on the communication device at the future time such that the words associated with the first audio component of the message are audible via the communication device.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the invention are described below with reference to a messaging platform hosted on the World Wide Web which enables users to generate messages, schedule delivery of the messages, and specify phone numbers to which the messages are to be transmitted. It should be noted that the described embodiments are merely exemplary and that a wide range of variations are within the scope of the invention. For example, at least some of the functionalities described below may be implemented on a computing device associated with the user, e.g., in a desktop application, plug-in, rich client, etc. So, while a hosted platform provides some advantages in terms of scalability and efficiency, the present invention is not so limited.

Figure 1:
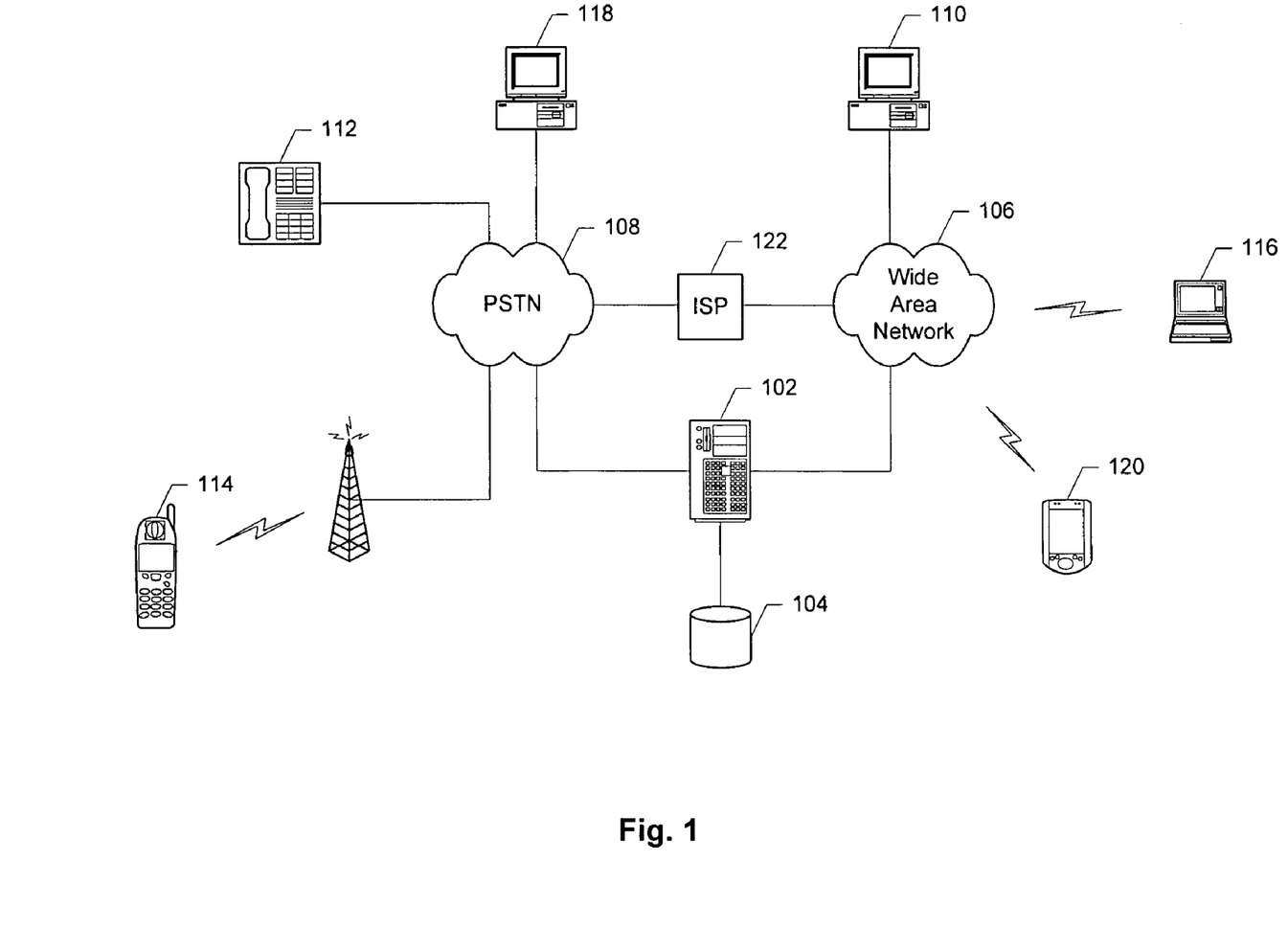
FIG. 1 is a simplified network diagram illustrating some exemplary devices and networks with which embodiments of the present invention may be implemented.

Referring now to FIG. 1, an exemplary network diagram is provided which illustrates at least some of the devices and modes of communication by which embodiments of the present invention may be practiced. It will be understood that these exemplary devices and modes of communication are by no means exhaustive. Server 102 and associated data store 104 represent a hosted messaging platform which may enable the various messaging functionalities of the invention. The hardware and operational details of server 102, data store 104, and the other devices and networks of FIG. 1 are not described herein as they are within the knowledge of one of ordinary skill in the art. It is sufficient to note that the functionalities of the present invention are implemented using computer code which is stored in and executed by one or more of the devices shown.

Server 102 (which may represent multiple devices) is connected to a wide area network 106 (e.g., the Internet) and a public switched telephone network (PSTN) 108. As will be described in greater detail below, a user of desktop computer 110 can access the web interfaces of server 102 via the Internet, and generate and schedule delivery of a message which is later transmitted by server 102 to a conventional telephone 112. Various other input and output channels for effecting the basic messaging paradigm of the invention are also contemplated.

For example, a message generated in the system could be transmitted to any of wireless handset 114, laptop 116, desktop 118, and handheld computing device 120. In addition, the generation and scheduling of messages may be accomplished using any of the devices shown. For example, desktop computer 118 may access the web interfaces of server 102 via PSTN 108 (i.e., using a modem), Internet Service Provider (ISP) 122, and network 106. Either of laptop 116 and handheld device 120 may also interact with server 102 via network 106. Even phones 112 and 114 may be employed to generate and schedule messages via PSTN 108 using their associated keypads and any suitable software at the server side (e.g., touch tone and/or voice recognition).

Figure 2:
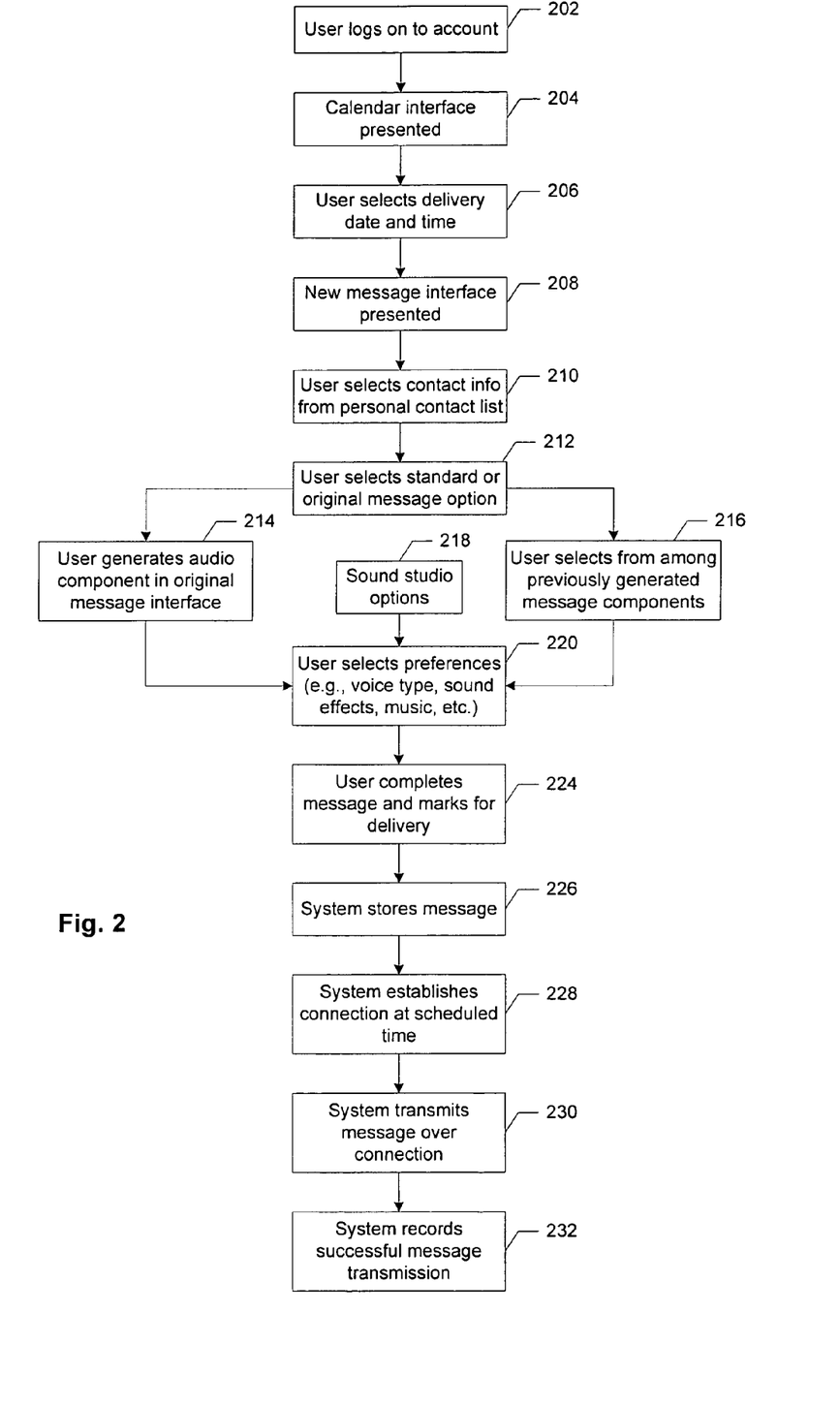
FIG. 2 is a flowchart illustrating operation of a specific embodiment of the invention.

An exemplary method for generating and scheduling delivery of a message will now be described with reference to the flowchart of FIG. 2 and the exemplary web interfaces depicted in FIGS. 3*a*–7. Access to the system may be controlled with user names and/or passwords. Each user sets up an account using any conventional approach. By then entering the correct user name and password from their computer (e.g., using the exemplary login interface of FIG. 3*a*), access to the user's account which may include a personalized set of web interfaces is provided (202).

Figure 3A:
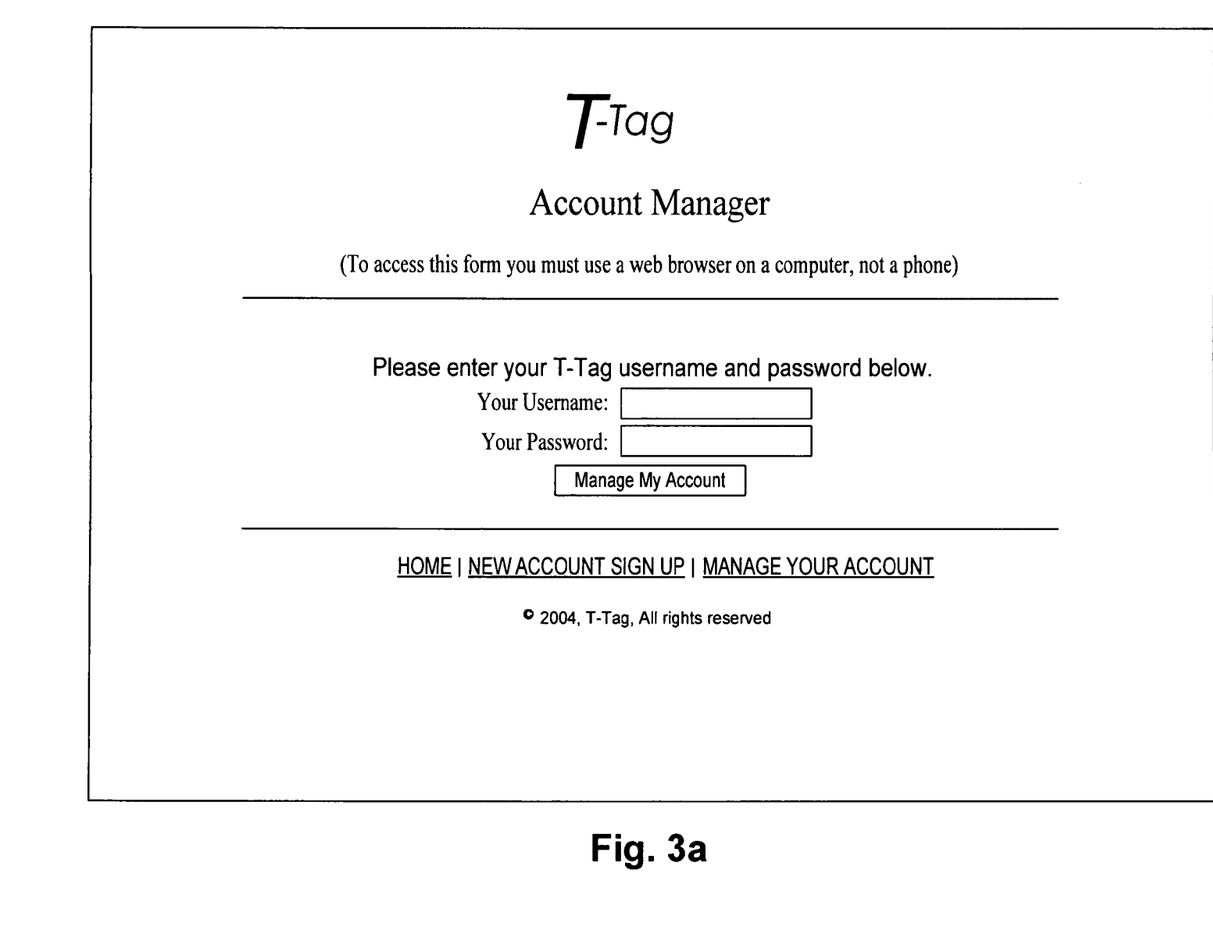
FIGS. 3a and 3b depict exemplary login and account management interfaces for use with a specific embodiment of the invention.
Figure 3B:
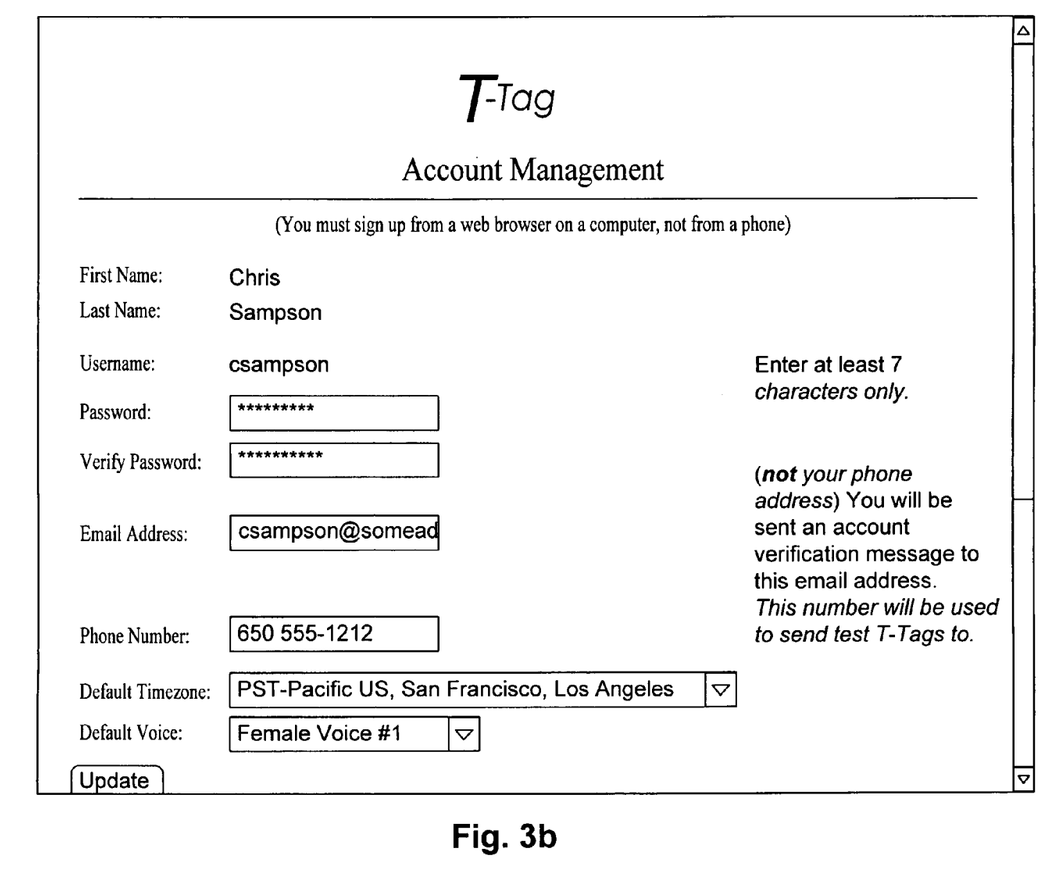
Figure 4A:
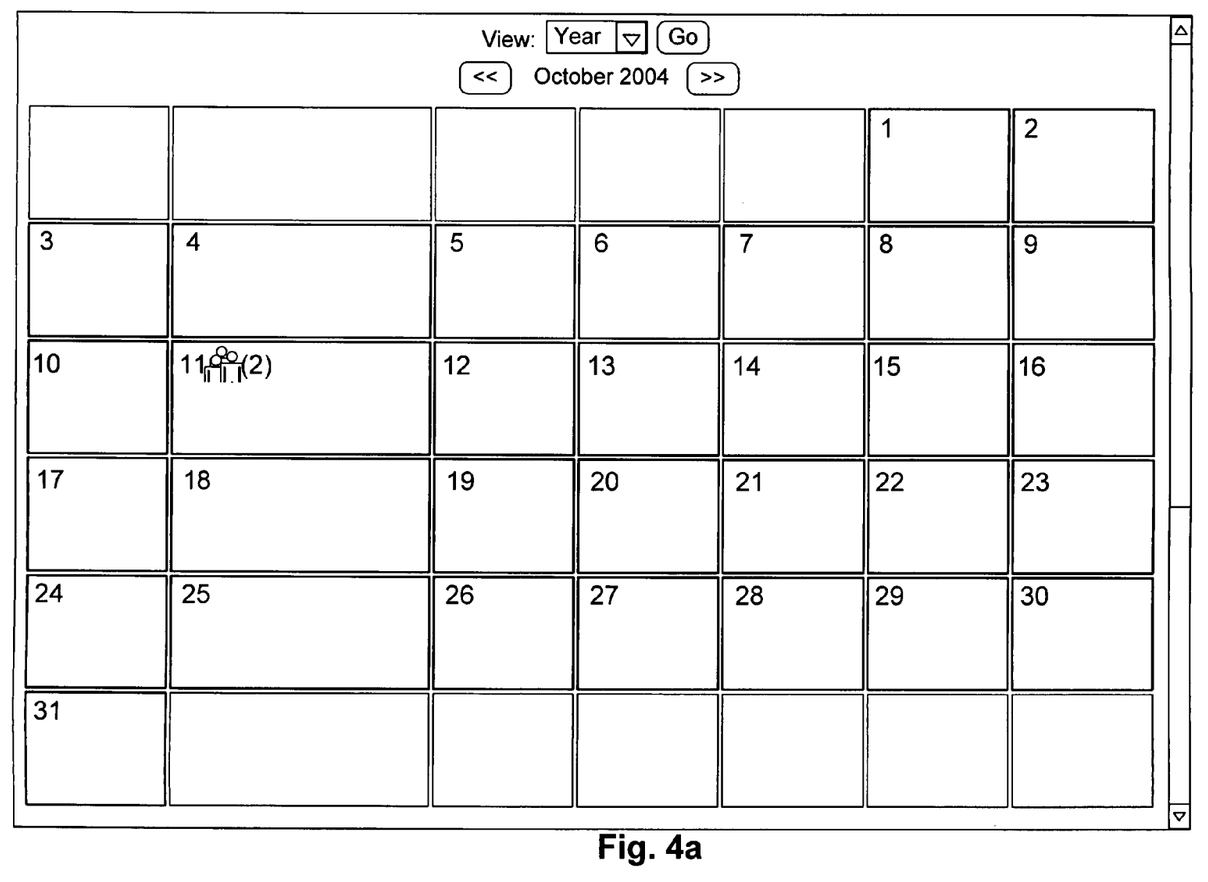
FIGS. 4a and 4b depict exemplary calendar interfaces for use with a specific embodiment of the invention.
Figure 4B:
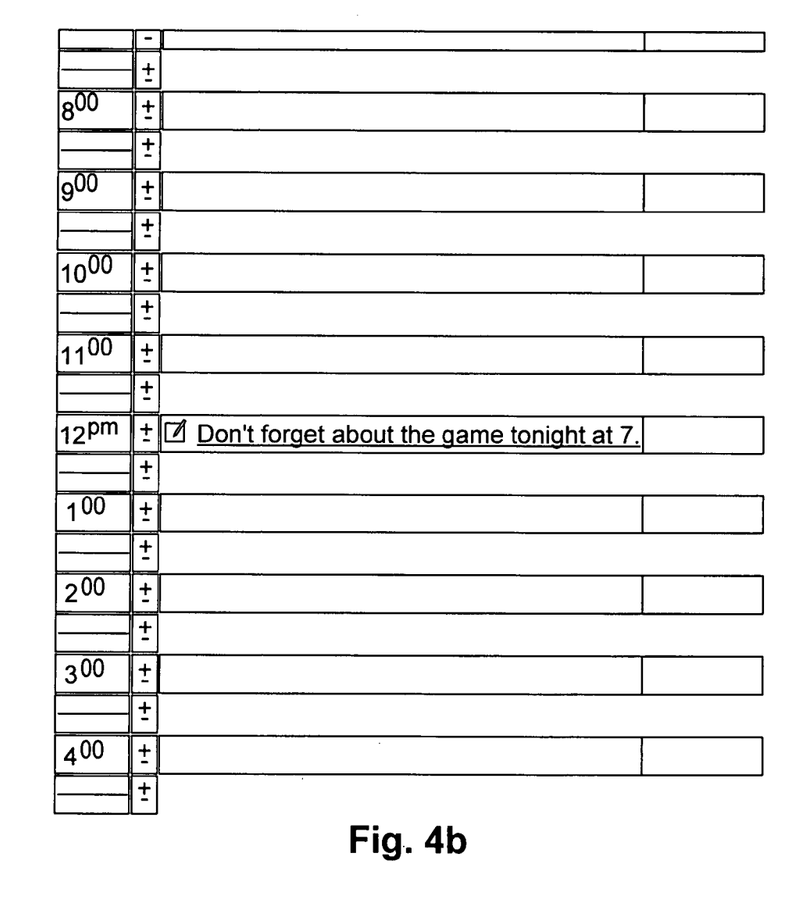

Associated with each user's account is a user profile which may be directly entered by the user upon setting up the account as shown in the exemplary Account Management interface of FIG. 3*b*. Alternatively, at least some of the information in the user profile may be derived from preexisting information such as an electronic business card, or a preexisting user profile or account associated with a web site or portal. The user's account also includes an associated contact/address book which includes contact information to which messages generated in the system may be directed. This information may also be derived from preexisting sources such as, for example, a Microsoft Outlook address book. Preferences or preferred settings may also be associated with a user's account and might include, for example, a default time zone (for the scheduling of messages), a default phone number for message pre-listening, a save to archive function (which may be the default), etc.

According to some embodiments, when a user logs into his account, one or more calendar interfaces are presented through which the system's functionalities may be accessed (204). As with many calendars (e.g., Outlook) there may be yearly, monthly (e.g., FIG. 4*a*), weekly, and daily (e.g., FIG. 4*b*) views. Any pending (i.e., previously scheduled) messages are indicated on the different views in a manner appropriate to each view. For example, a monthly view might have a number on a particular date indicating the number of messages scheduled for delivery on that date. Alternatively, a daily view might have each message indicated in a time slot with some associated text relating to the nature of the message. According to one embodiment, for recurring messages, only the next scheduled message may be shown.

Figure 5:
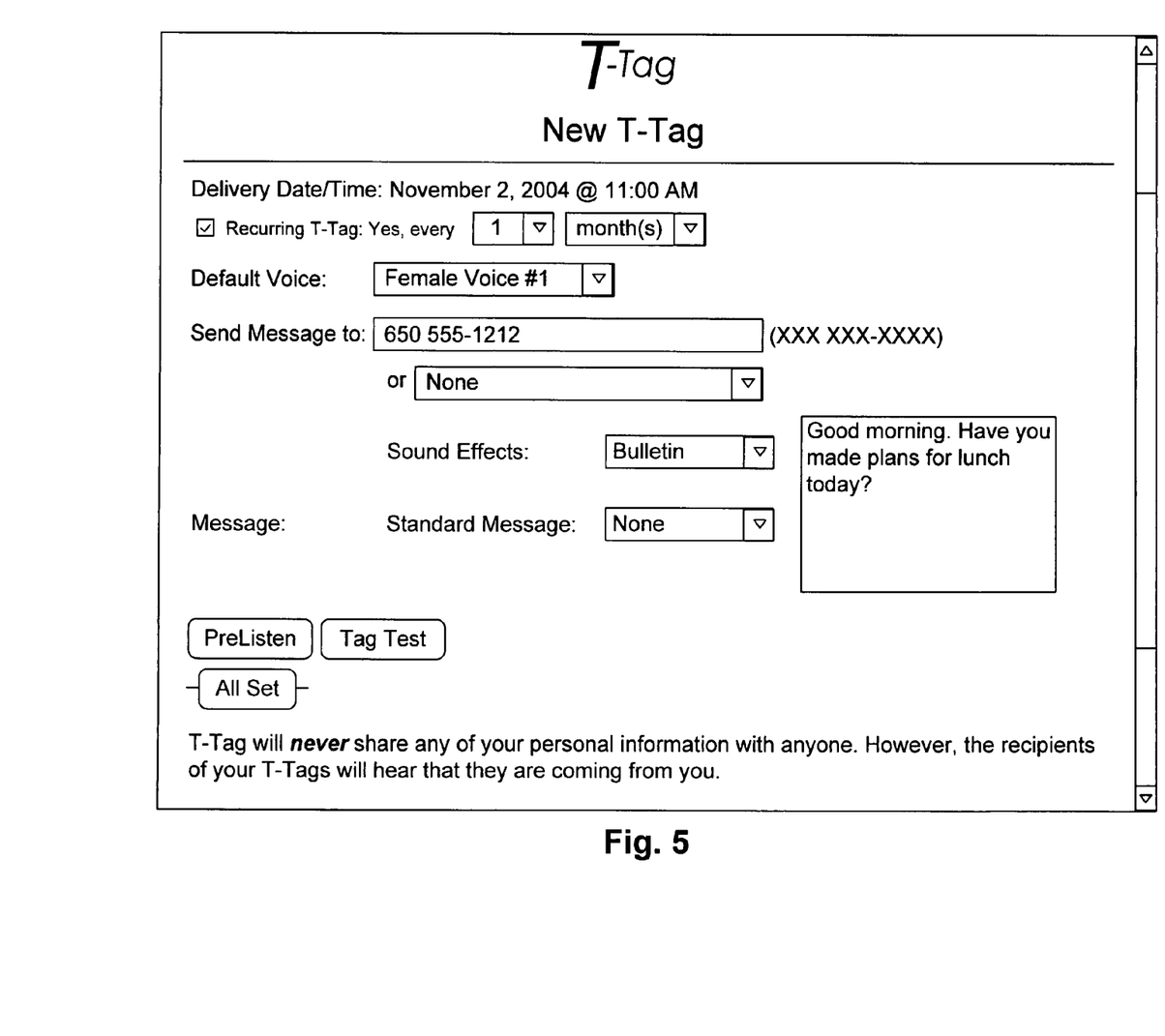
FIG. 5 depicts an exemplary existing message interface for use with a specific embodiment of the invention.

The user may select any of the pending messages to obtain more detailed information about the selected message including, for example, options to preview the message, or edit the selected message in some regard. The detailed information may be presented using a message generation interface (e.g., as shown in the interface of FIG. 5) in which the message was originally generated with the fields already populated with the message details. According to some embodiments in which the pending messages include messages directed to the user by another user, the user's options relating to the message may be limited, e.g., the user may not be able to edit such messages. When a user selects a message for editing, the message is pulled from the delivery queue to prevent the message from being delivered while it is being edited.

According to at least one embodiment, the user may view pending messages in a queue interface which lists the pending messages in the order in which they are scheduled for delivery. As with the calendar interface described above, selection of one of the messages may provide more detailed information or enable options (e.g., preview or edit) relating to the selected message.

To generate and schedule a new message, the user navigates to a desired location in the calendar and selects a day and a time (206), in response to which a new message generation screen (e.g., the interface of FIG. 6) is presented (208). As shown, the delivery date and time fields are populated based on the selection made by the user in the calendar interface. This information may then be manually altered by the user if desired. Other modes of specifying the message delivery time are also contemplated including, for example, recurring messages (e.g., the first Friday of each month), and some time period in the future (e.g., 10 days from today).

Figure 7:
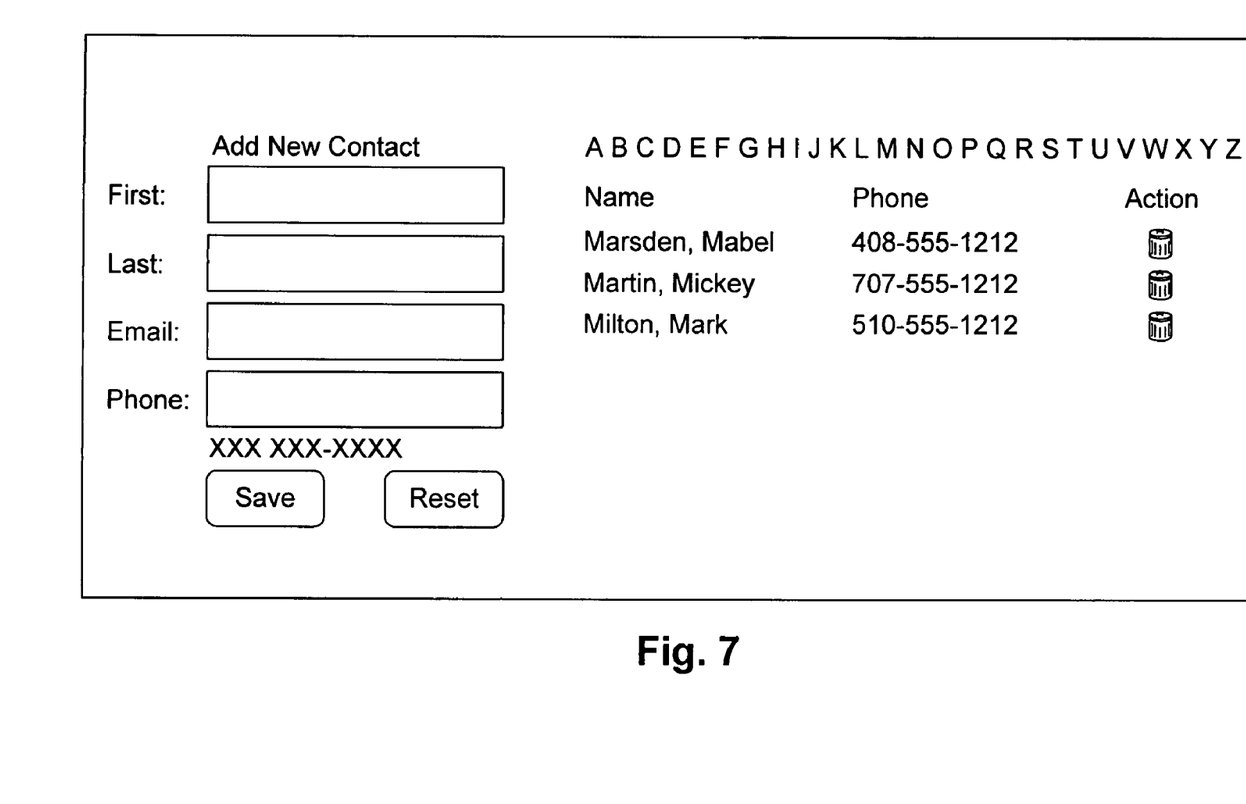
FIG. 7 depicts an exemplary contact interface for use with a specific embodiment of the invention.

The user then specifies contact information to which the message is to be delivered. The contact information may take many forms. For example, the user may specify a phone number corresponding to a conventional phone or a wireless handset. Alternatively, the user may specify an email address to which the message is to be delivered. The user may also specify a network address or identify an IP phone to which the message is to be transmitted. In any case, the contact information may be derived from any of a variety of sources including, for example, an existing personal contact list or database (210) on or available to the user's device, e.g., a Microsoft Outlook address book. An exemplary contact interface is shown in FIG. 7. According to specific embodiments, multiple recipients of a single message may be specified.

It should be noted that, depending on the device with which the user is interacting with the system, the specification of delivery time, contact information, and other message parameters may be accomplished in a variety of ways. For example, if the user is generating and scheduling the message from a conventional or cell phone, the relevant information may be derived through the use of touch tone or voice recognition software.

The message may contain one or more audio components which may be delivered over a variety of networks or connections to a communication device. The user may select from among available components and/or create original components (212). According to one embodiment, an original audio component is generated from words entered by the user during the message generation process (214). The words may be entered by the user in a variety of ways depending on the nature of the interface or device from which the user is generating the message. According to various embodiments, the user enters the words as text. This may be done using a text box in a web interface (e.g., text box 602 in the interface of FIG. 6), a phone keypad (e.g., SMS text messaging), voice recognition software, an email message, etc. According to other embodiments, the words are captured by recording the user's voice, e.g., using a microphone associated with a desktop computer or over a phone connection with the user speaking into the handset.

Such original audio components and any previously generated audio components (discussed below) may take any of a variety of forms suitable for particular applications. That is, such audio components may be stored using any suitable analog or digital recording technique and format. Examples of such techniques and formats include, but are not limited to, .wav (Wave file), .mp3 (Mpeg 3 file), and .ram (Real Audio streaming file).

The user may also have the option of selecting from among a plurality of previously generated audio components (e.g., music, sound effects, standard messages) for inclusion in the message (216). This inclusion may take the form, for example, of mixing, prepending, or appending the previously generated component to an audio component generated by the user. Such previously generated audio components may also include prerecorded reminders or alerts, e.g., "You have a doctor's appointment at 3 pm today."

Standard message types (e.g., appointment reminders, wake-up calls, birthday greetings, etc.) may include various previously created components which may be used "as is," or which may be customized. For example, selection of a particular message type might result in presentation of a template to the user in which the user may enter various specific customizations (e.g., components to be included, voice type, recipient's name, recipient's phone number, etc.).

According to some embodiments, the message being delivered includes an initial announcement identifying the message as a reminder or an alert. This announcement may also identify the sender of the message, e.g., "I have a message from Larry." Additionally, the announcement might also indicate the intended recipient of the message, e.g., "I have a message for Bob from Larry." According to various embodiments, the sender or recipient could be identified, for example, from the contact information or by the user in the message generation interface.

According to a specific embodiment, the user is provided a premium service option which includes access to sophisticated sound studio software (218) which enables the user to create highly produced messages with virtually any desired component, e.g., originally composed music. According to a more specific embodiment, such software would include the capability of generating multiple tracks (e.g., Apple's Garage Band) and the capacity to compose music for instruments and/or voice. Such software may also enable a variety of capabilities including, for example, the integration of voices, music sound effects, user-created sounds, and standard messages in original messages. According to one embodiment, different voices may be embedded in a single message to simulate dialogue. Such software may also be employed for the customization of preexisting message components.

In addition, a premium service option could be provided in which the user can select his or her own voice. According to such an implementation, the user could be prompted to record several "training" phrases from which a sufficient number of phonemes or voice samples may be derived to generate a wide range of messages.

According to some embodiments, the audio component corresponding to the words entered by the user is generated using a text-to-speech conversion engine which may, for example, be any of Natural Voices (AT&T), Conversation Server (Conversay), DecTalk (DecTalk), Elan TTS (Elan Informatique), Nuance Vocalizer (Nuance), and ViaVoice Outloud (IBM). The text may be entered in a variety of ways, some of which depend on the device and/or interface employed by the user to generate and schedule the message. For example, as discussed above, a simple text entry box may be used in an interface on a desktop or laptop computer. On the other hand, if the user is employing a wireless handset, text may be entered using the handset's keypad and transmitted using an SMS text messaging protocol. For devices which support handwriting recognition, the text may be entered using the device stylus. Embodiments are also contemplated in which the text is entered and delivered to the system using an email message.

According to some embodiments, the user may select from among a variety of voice type options and other preferences to customize the sound of the message (220). According to one embodiment, a voice matrix approach is employed. On one side the user selects gender and age, e.g. young woman, and on the other, certain emotions or voice characterizations, e.g., sultry, serene, stern, anxious, etc. So, for example, a user might select an anxious old man by setting the two sides of the matrix. The myriad possibilities for such options are understood. With respect to previously generated audio components, various user preferences relating to sound effects and voice types may also be specified.

Figure 6:
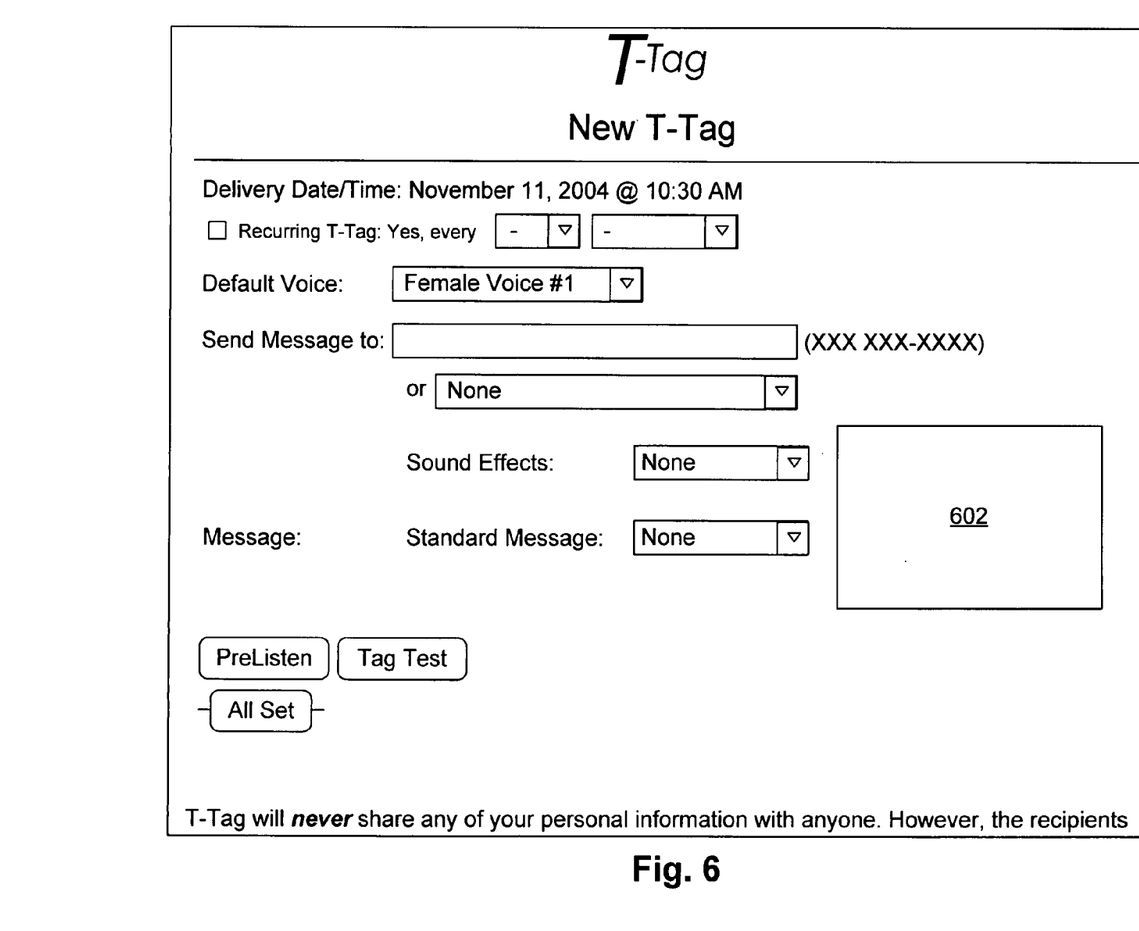
FIG. 6 depicts an exemplary new message interface for use with a specific embodiment of the invention.

According to one implementation, the audio component(s) of a message may not be created at the time the user enters the message particulars in the new message interface (e.g., the interface of FIG. 6). Instead, the audio components (and particularly the text-to-voice components) for multiple messages may be periodically created in a batch. That is, the system can periodically determine, e.g., every few minutes or every hour, whether there are any pending messages for which audio components need to be generated. If so, the necessary audio components are generated. Alternatively, audio components could be generated only for messages scheduled to be delivered in an upcoming time period, e.g., for all messages to be delivered tomorrow. According to one embodiment, before each message is sent out, the system determines whether any necessary audio components have been generated and, if not, generates them.

Once message generation is complete, the user has the option of previewing or "pre-listening" to the message and making any desired changes. According to some embodiments, accurate translation from written text to speech may be further facilitated by, for example, prompting the user to clarify unclear text upon entry.

According to a specific embodiment, the user may activate a sound test feature (e.g., by selecting the PreListen button of FIG. 6) to play the message before marking it for delivery. Selection of this feature causes the audio portions of a message to be generated, hosted on the server, and played through the user's browser. According to a more specific embodiment, a .wav file is generated from the text entered by the user is sent by a text-to-speech engine.

According to another embodiment, the user may activate a message delivery test feature (e.g., by selecting the TagTest button of FIG. 6) to deliver and play the message over a designated device before marking it for delivery. Selection of this feature places the message in an immediate delivery queue which has its own dispatcher demon (operation of which is described below) which establishes a connection to the designated test device (e.g., the user's cell phone) and plays the message.

When the user is satisfied with the message, he may indicate that the message generation is complete by marking the message for delivery (224), in response to which the system stores some or all of the message components for delivery (226). As discussed above, the pending message may then be represented in any of a variety of interfaces; e.g., a calendar or a queue, from which the user may select the message for pre-listen or editing. According to one embodiment, the user has the option of archiving a completed message or any of its components in a personal archive by selecting an "archive" button or some equivalent mechanism.

According to a specific embodiment, pending messages in the queue (which may reside in server 104) may include text, time and date of delivery, and other accompanying data such as, for example, recurring notations, sounds, voice selection and other voice options. A unique ID and message status (e.g., Pend) is assigned upon delivery to the queue. Message order in the queue is defined by time and date of delivery. An audio slave demon (ASD) wakes periodically (the period being programmable). The ASD scans the queue to find new messages, i.e., messages for which the text and/or sound have not yet been converted to an audio file, i.e., messages with status=Pend. For each such message, the ASD passes a copy of the text and voice options to the text-to-speech engine (TSE). The TSE then generates an audio file (e.g., a .wav file) which is stored in server 104. The audio file is correlated with the corresponding message in the queue via its unique ID. The status of the message in the queue then changes to reflect that this process has been completed, e.g., the status is changed from Pend to Pend1.

When the delivery time arrives, a connection is established to the communication device(s) identified by the contact information associated with the message (228). This may mean establishing a phone connection to a conventional telephone or wireless device via their respective networks. Alternatively, it may mean establishing a TCP/IP connection to an IP phone or other communication software on a computer. It may also mean establishing a connection to an email server for transmission of the message as an email. The connection to the communication device may be established, for example, by a server hosting the message service or by a stand-alone machine over a modem.

According to a specific embodiment, a dispatcher demon (DD) wakes periodically (the period being programmable) and looks for all messages ready for delivery in the queue, i.e., messages for which status=Pend1 and for which the stipulated delivery time lies in a window defined relative to the current time, e.g., the current time plus or minus some defined duration (e.g. 2 minutes). According to a more specific embodiment, the DD intelligently orders the messages identified as ready for delivery based on any of a variety of parameters. For example, the DD may prioritize messages for which the stipulated delivery time is earlier than the current time. In general, the DD may refer any of a wide variety of parameters to effect the most efficient ordering of messages including, but not limited to, the number of messages currently pending in the queue, the size of particular messages, and the available call line resources.

Once the messages are ordered, the DD inserts each message at the appropriate time into the script of a Voice XML Server (e.g., Vocomosoft). The Voice XML server associates script and phone line, dials the specified phone number, and runs script using the .wav file associated with the message ID. The Voice XML server may also run sounds and any standard intro or ending messages. The Voice XML server then gives the message and results (e.g., connected, time out (N/R), hangup) back to the DD. The DD changes the status of the message to reflect this information and then returns the message to the queue.

According to one embodiment, the DD inspects to see if the message is recurring. If so, the DD determines the time interval until the next delivery, changes the delivery time and date accordingly, changes the message status to Pend and puts the message in the queue. The results of the message delivery attempt (e.g., connected, time out, or hangup) are recorded in the status or other field. According to one embodiment, the DD generates an email to the user recording results of message, and all DD actions are recorded in a log.

The message may be presented over the connection (230) in a variety of ways depending on the nature of the component(s) with which the message is constructed and the capabilities of the receiving device. For example, if the receiving device is a conventional or wireless phone, the audio component(s) may simply be played over the connection to the device. If the device supports text messaging (e.g., SMS), at least a portion of the message may be presented as text.

If, on the other hand, the receiving device is a computing platform of some kind, the message may be presented in a variety of ways. For example, if the platform has an IP phone or other voice communication software, the message may be played using such software. Alternatively, the message may be sent as an email which may include text and/or one or more appended audio components (e.g., a .wav file) which may be selected and played by the recipient. The email might also contain html with links to the audio components of the message (which may be stored, for example, on server 102).

In cases where the communication device is a real-time voice communication device, e.g., a conventional or wireless phone, the system may be configured to wait until someone answering the call speaks before delivering the message. In some cases, the communication device to which the message is directed is not available. Therefore, according to some embodiments, attempts to deliver the message are repeated until the message is delivered successfully, or until some programmable number of failures has occurred. In some implementations, attempts to deliver the message may be made to alternative communication devices and/or recipients specified by the user. In addition, a failure to deliver a message may also be communicated to the user or other appropriate party via any of the mechanisms described herein.

When the connection does not reach a live person, but instead reaches a voice mail box, embodiments of the invention may be configured to detect that a voice mail box has been reached, and then wait until the outgoing recording finishes before delivering the message.

According to some embodiments, the recipient of a message which is generated and delivered according to the present invention may take advantage of system functionalities. According to one such embodiment, the recipient of a message may replay a message by, for example, selecting a designated key on his phone keypad or speaking the word "replay" into the handset. Other options might include requesting a repeated later delivery of the message by selecting the later delivery time using touch tone or voice recognition.

When the system deems a message to have been successfully delivered to the receiving device, a system notification is generated to record the successful delivery (232). This notification may be employed by the system to delete the message from the user's queue, and/or to generate a notification (e.g., an email) to the user indicating successful delivery, etc.

Hosted messaging platforms implemented according to some embodiments of the invention may also provide a wide range of "back office" functionalities to facilitate system operation. For example, the number of messages generated and scheduled by each user could be monitored for a number of purposes, e.g., billing, load balancing, identification of spammers, etc. Such hosted platforms are also highly scalable, enabling many users to simultaneously generate messages, and being capable of transmitting many such messages substantially simultaneously.

Some systems designed according to the present invention may be subject to both traditional "nuisance call" problems and spam problems. Nuisance calls can be controlled by user contract language, by system monitoring (e.g., keying on repeated messages to the same number), and by appending system operator messages. Such system operation messages might, for example, instruct message recipients to contact the system operator in cases of nuisance calling. Spam-prevention can also employ appended messages, system-operator monitoring, and contractual limitations on users.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention are contemplated in which some portion of the functionalities described above are facilitated by the user's platform or device. Embodiments are also envisioned that take advantage of external application programming interfaces associated with popular applications, e.g., Microsoft Outlook, or portals, e.g., Yahoo!, to integrate at least some of the functionalities described herein within interfaces with which users are already familiar. In addition, some or all of the described functionalities may be provided in conjunction with other services on a phone service carrier's web site.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A Web-based, computer-implemented method for creating, scheduling and delivering messages using a messaging system, the method comprising:

generating a plurality of messages from a plurality of message creators for a plurality of message recipients, each message creator having his own account with the messaging system, each message having a first audio component generated in response to input from a corresponding one of the message creators, the input including words entered by the corresponding message creator, the first audio component being operable to facilitate audible playback of the words;

scheduling delivery of the messages at corresponding future times to communication devices in response to specification by the message creators of the future times and contact data corresponding to the communication devices;

placing the messages in a common delivery queue ordered in accordance with the corresponding future times;

establishing a connection to each communication device at the corresponding future time via at least one communications network; and transmitting the messages over the connections such that the words associated with the first audio component of the messages are audible via the communication devices;

wherein generating and scheduling delivery of the messages are facilitated via the World Wide Web.

2. The method of claim 1 wherein the messages are generated and stored on at least one server on the World Wide Web which is remote from the message creators and message recipients.

3. The method of claim 2 wherein establishing the connections and transmitting the messages are facilitated by the server.

4. The method of claim 1 wherein generating and scheduling delivery of at least one of the messages are facilitated by a phone handset associated with the corresponding message creator.

5. The method of claim 4 wherein the future time for the at least one of the messages is specified by the corresponding message creator using one of a keypad associated with the phone handset and voice recognition software.

6. The method of claim 4 wherein the words for the at least one of the messages are entered by the corresponding message creator by one of speaking into the handset and entering text using a keypad associated with the phone handset.

7. The method of claim 1 wherein the words for at least one of the messages correspond to text entered by the corresponding message creator in a text interface, and wherein generating the at least one of the message comprises converting the text to the first audio component.

8. The method of claim 7 wherein generating the at least one of the messages further comprises selecting one of a plurality of voice types for playback of the words.

9. The method of claim 1 wherein the words for at least one of the messages correspond to an audio recording made by the corresponding message creator, and wherein generating the at least one of the messages comprises including the audio recording in the first audio component.

10. The method of claim 1 wherein the words for at least one of the messages correspond to text entered by the corresponding message creator in an email, and wherein generating the at least one of the message comprises converting the text to the first audio component.

11. The method of claim 1 wherein at least one of the messages includes at least one other audio component.

12. The method of claim 11 wherein the at least one other audio component comprises at least one of music and sound effects.

13. The method of claim 1 further comprising facilitating specification of the future times by the message creators by enabling the message creators to identify at least one of a specific date and time of day, a recurring time, and a time period beginning at a specific date.

14. The method of claim 13 wherein facilitating specification of the future time comprises providing a calendar interface to each of the message creators.

15. The method of claim 1 wherein at least some of the communication devices comprise telephones and the at least one communications network comprises the PSTN.

16. The method of claim 1 wherein at least some of the communication devices comprise wireless devices and the at least one communications network comprises a wireless communication network.

17. The method of claim 1 wherein at least some of the communication devices comprise computing devices and the at least one communications network comprises a wide area network.

18. The method of claim 17 wherein the connections to the computing devices comprise TCP/IP connections and transmission of the messages over the TCP/IP connections comprises employing a voice-over-IP protocol.

19. The method of claim 1 further comprising leaving at least one of the messages as a recording where the connection to the corresponding communication device is not answered by a person.

20. The method of claim 1 further comprising enabling at least one of the message creators to specify the contact data associated with a corresponding communication device.

21. The method of claim 20 wherein enabling the at least one of the message creators to specify the contact data comprises providing a contacts interface to the at least one of the message creators by which the at least one of the message creators may select the contact data from previously stored contact information.

22. The method of claim 1 further comprising saving the first audio component associated with at least one of the messages for use in generating a subsequent message.

23. The method of claim 1 wherein a first one of the communication devices has a second communication device associated therewith, the method further comprising establishing at least one other connection to the second communication device via the at least one communications network, and transmitting a first one of the messages corresponding to the first communication device over the at least one other connection substantially simultaneously with transmitting the first message to the first communication device.

24. The method of claim 1 wherein generating at least one of the messages further comprises facilitating selection by the corresponding message creator of a message type from among a plurality of message types, each message type corresponding to at least one previously generated component which is then integrated with the first audio component to generate the at least one of the messages.

25. The method of claim 1 further comprising enabling the message creators to pre-listen the messages prior to transmission of the messages to the communication devices.

26. The method of claim 25 further comprising enabling the message creators to edit the messages.

27. A computer program product for creating, scheduling and delivering messages using a messaging system, the computer program product comprising at least one computer-readable medium having computer program instructions stored therein which are operable to cause at least one computer to:

generate a plurality of messages from a plurality of message creators for a plurality of message recipients, each message creator having his own account with the messaging system each message having a first audio component generated in response to input from a corresponding one of the message creators, the input including words entered by the corresponding message creator, the first audio component being operable to facilitate audible playback of the words;

schedule delivery of the messages at corresponding future times to communication devices in response to specification by the message creators of the future times and contact data corresponding to the communication devices;

place the messages in a common delivery queue ordered in accordance with the corresponding future times;

establish a connection to each communication device at the corresponding future time via at least one communications network; and transmit the messages over the connections such that the words associated with the first audio component of the messages are audible via the communication devices;

wherein generating and scheduling delivery of the messages are facilitated for via the World Wide Web.

* * * * *